United States Patent [19]

Gove

[11] Patent Number: 5,099,322

[45] Date of Patent: Mar. 24, 1992

[54] SCENE CHANGE DETECTION SYSTEM AND METHOD

[75] Inventor: Robert J. Gove, Plano, Tex.

[73] Assignee: Texas Instruments Incorporated, Dallas, Tex.

[21] Appl. No.: 485,929

[22] Filed: Feb. 27, 1990

[51] Int. Cl.⁵ .............................................. H04N 5/19
[52] U.S. Cl. ...................................... 358/105; 358/160
[58] Field of Search ................................. 358/105, 160

[56] References Cited

U.S. PATENT DOCUMENTS 4,257,063  3/1981  Loughry .............................. 358/105

4,774,570  9/1988  Araki .................................. 358/105

Primary Examiner—Howard W. Britton
Attorney, Agent, or Firm—L. Joy Griebenow; Richard L. Donaldson; William E. Hiller

[57] ABSTRACT

A system detects scene changes in a sequence of video images by analyzing the sequence for abrupt frame-to-frame changes in certain image features. The system accepts the signal into a quantizer, which digitizes the image, and stores it into a frame buffer. An image processor, a component of the system, analyzes the digitized images, and determines certain features which a decision processor can use to detect a scene change.

33 Claims, 4 Drawing Sheets

SCENE CHANGE DETECTION SYSTEM AND METHOD

BACKGROUND OF THE INVENTION

1. Field of the Invention

This invention pertains to video image sequence editing, and more particularly to automatic scene change detection.

2. Description of Related Art

Scene change detection in video systems has wide implications to visual information products. In the typical editing process for a video production the director relies on a written log which describes the contents of each scene in the raw video footage and connects that information with the location on a tape by means of a time code number. An operator must manually produce the log by viewing the tape and making notations whenever a scene change occurs.

Another operation frequently preformed in both viewing and editing video tapes is fast-forward and rewind. The user may fast-forward or rewind for the purpose of finding a particular scene. In prior art systems that may be done either at a very high speed which does not allow viewing the images on the tape or at an intermediate speed which is not much faster than normal viewing speed. At high speed the user would guess the location of a scene and stop the tape at that location. Usually the desired scene is missed. However, the intermediate search speed is also unsatisfactory because the user must continuously view the tape in an attempt to locate the desired scene. Furthermore, the intermediate speed is limited by the rate at which images may be comprehended by human eyes and minds. It would therefore be useful for users to fast-forward/rewind on a scene-by-scene basis.

Scene change detection relies in part on detecting motion in a sequence of images. This area has seen much research and product development, primarily for defense applications of Automatic Target Recognition (ATR). Real-time and reliable motion extraction over a wide range of noise and scene conditions from visual motion, however, has not been attained (Waxman, A. et al., *Convected Activation Profiles and the Measurement of Visual Motion*, CH2605-4/88/0000/0717, IEEE 1988 and Verri, A., and T. Poggio, *Against Quantitative Optical Flow*, CH2465-3/87/0000/0171, IEEE 1987).

Merely detecting motion is quite simple when there is no camera motion or illumination changes. A pixel-to-pixel difference of two successive images followed by a threshold operation yields a motion gradient. If the object moves, a large difference indicates motion has occurred. Unfortunately, if the camera moves, or if the sensed illumination of a pixel changes, as when induced by shadows or clouds, a significant false motion gradient results. If one knows the camera has moved or noise is present, these effects can be removed (Thompson, W. and T. Pong, *Detecting Moving Objects*. CH2465-3/87/0000/0201, IEEE 1987). However, in video scenes of unknown origin, like that on a video tape, this information is not available.

SUMMARY OF THE INVENTION

It is an object of this invention to use a computer connected to a video signal source to analyze a video signal for the purpose of detecting scene changes in the sequence of images produced by the source.

It is also an object of the invention to select from a used independently or conjunctively, so as to ensure that the system applies an appropriate method, considering applicable assumptions and circumstances, in terms of computational cost.

It is also an object of the invention to use the scene change detection method in video editing applications, such as the automatic creation of video tape logs, scene sensitive fast-forward navigators, and in video surveillance systems.

These objects are accomplished in the present invention by employing a computer connected to a video signal source. The computer accepts and digitizes the video image frames produced by the video source. Image processing hardware and software in the computer analyze the digitized representation of the video sequence for detecting scene changes.

Scene change detection with the present invention entails detecting dramatic changes in scene content, such as switching from an interview to a cityscape. Minor changes, such as a person moving within the scene, will not trigger a scene change detection with the scene change detector of the present invention.

The scene change detector can employ a number of algorithms of varying complexity and computational cost. The simpler algorithms are used when a number of assumptions may be made about the content of a sequence of video images, for example a series of interviews in a studio with controlled light conditions and a stationary camera. In those situations the system uses a technique involving separating the scene into distinct detection zones and monitoring those zones for changes in a measureable feature, for example light intensity. When the scenes involve camera motion and a noisy background, for example, the system uses more complicated algorithms in which objects are detected and tracked in the scene. Whenever an object changes dramatically or enters or leaves the picture, a scene change is detected.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings:

DETAILED DESCRIPTION OF THE INVENTION:

The scene change detector of the present invention, accepts a video frame sequence from a video source. The frames may be produced by a video camera, video disc player or video tape recorder, or any other video source. A person skilled in the art will realize that the invention is not limited to scene change detection for video sources but will work for any source that generates a sequence of images. However, in the preferred embodiment a video source produces a sequence of video frames. The frames are converted to digital representation, which is stored on a frame-by-frame basis. A digital computer analyzes the digitized video frames by means of image processing techniques to detect scene changes. A scene change is defined as a dramatic change in the picture, for example an entirely different view, or a subtle change such as when an actor enters or leaves the stage.

The algorithms used for detecting scene changes rely either on a change in one or more of an object's physical features, such as, but not limited to, light intensity, texture, size, or color, or by tracking objects as they move in and out of a scene. An object may represent a natural subject in the scene or an estimation region which contains at least some portion of an actual subject. The invention consists of a number of techniques, ranging from simple to complex. Design criteria, such as what assumptions can be made about the sequence of video images, circumstances like camera motion or busy backgrounds, and cost constraints, dictate whether these techniques are used separate from each other or in combination. In the simpler techniques those objects are several areas in the image, referred to as detection zones. In the more complex, on the other hand, the objects are pixel regions which have similar values for one or more physical features.

Whenever a scene change has been detected, that information is passed along to an application module. The application may be video tape log generation, in which the application interface is a Hypercard stack, with each stack card holding vital information about the scene as well as a representative image from the scene. Another application is a fast-forwarding editing machine, in which a function would be to move to the next scene, the previous scene, or to any other desired scene. A third application is for security systems using a video camera as the video frame source. When a scene change was detected, as by a person entering the view of the camera, an alarm would be triggered. Applications of the scene change detector are discussed in greater detail below.

Figure 1:
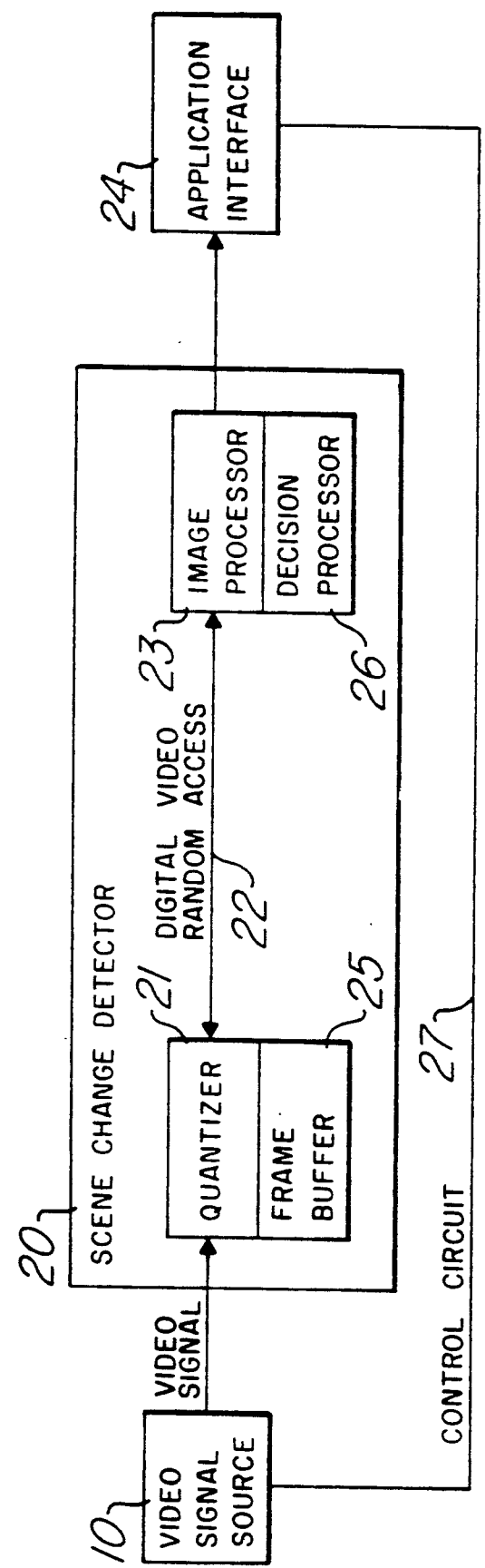
FIG. 1 is a block diagram of a scene change detector of the present invention, its video signal source, and its application interface.

One implementation of the hardware for the scene detection system is shown in FIG. 1. A video signal is produced by any video signal source 10, for example a Video Cassette Recorder (VCR), video disk or a video camera. The signal is communicated to scene change detector 20 comprising a computer system for analyzing the signal and detecting scene changes. In scene change detector 20, the signal is first converted to a digital representation by quantizer 21 and stored in frame buffer 25. Quantizer 21, which may be a frame grabber board, or an equivalent assemblage of devices, consists of analog-to-digital converters, memory areas, and, optionally, digital-to-analog converters. Digital-to-analog converters are not necessary components of the quantizer, however, they are usually parts in commercially available frame grabber boards. The frame buffer 25 is a random access memory which gives the image processor 23 access to the images. The implementation of frame grabber boards and random access memories, and using such memories as frame buffers is considered to be well known in the art.

The image processor 23 accesses video images stored in the frame buffer 25, and, in concert with decision processor 26, executes the scene change detection computation. Furthermore, image processor 23 extracts the scene change time code number by counting video frames from the beginning of the sequence to the currently detected scene change. Image processor 23 and decision processor 26 may be implemented in a number of ways, ranging from a single programmable component, such as Texas Instruments' TMS320C25 DSP, to several processing components, depending on system requirements and cost goals. Each additional processor would add features or motion measurement capabilities to decision processor 26. Furthermore, decision processor 26 may be included in image processor 23, if the latter is a programmable image processor such as, a digital signal processor.

Figure 2:
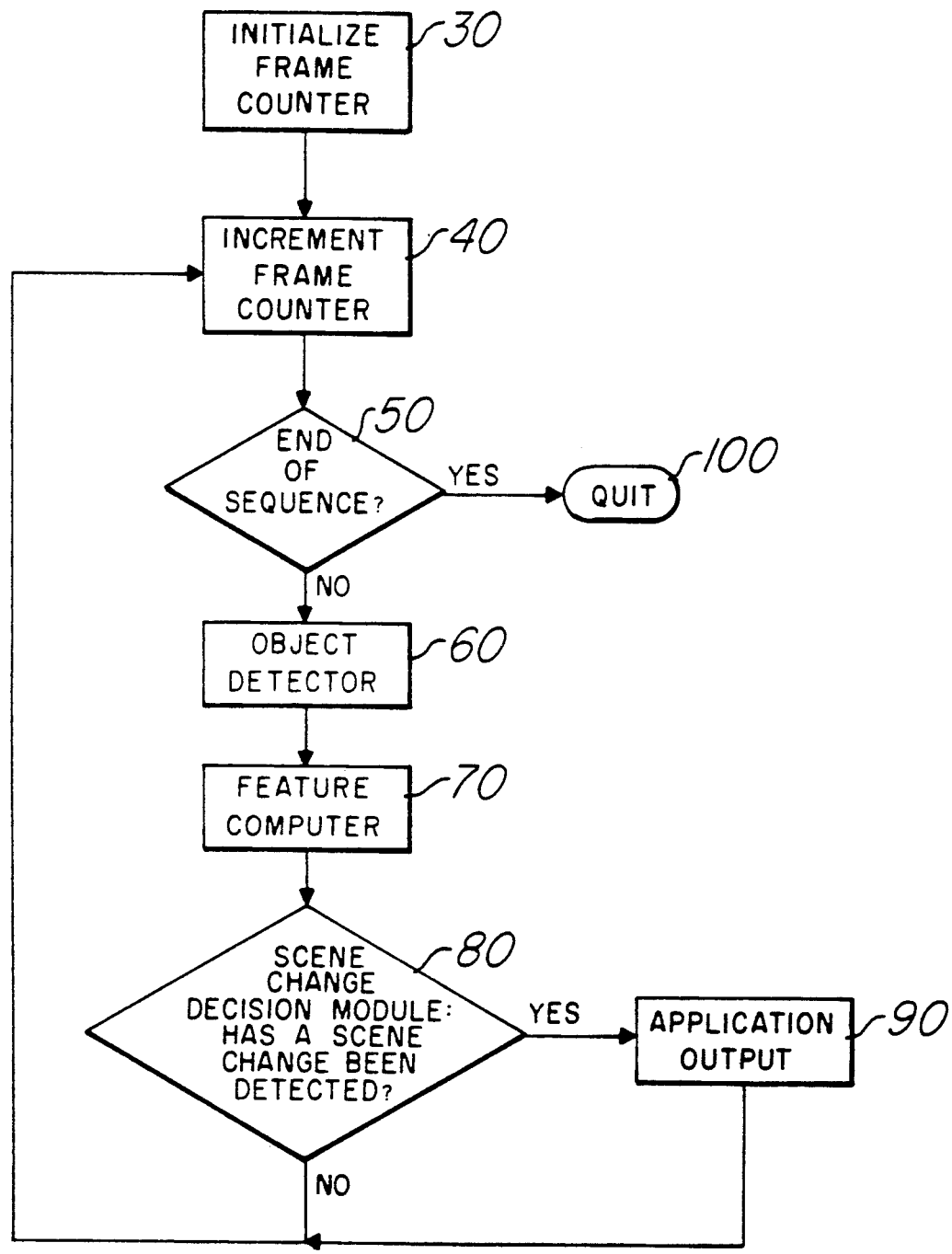
FIG. 2 is a flow chart of a preferred embodiment implementing the scene change detection system and method of the present invention.

FIG. 2 shows the modules involved in the analysis of scene changes. The process starts with step 30 by initializing the frame counter to point to the frame immediately before the first frame in the sequence to be analyzed. Frame count incrementor 40 increments the frame counter. Initializing and maintaining a frame counter serves two purposes, namely, making it possible to correlate a detected scene change to a time code number and to keep track of which frame is currently being processed. However, it is important to note that the modules described below may use a number of frames simultaneously in their respective computations.

Object detector 60 detects objects and creates a list of objects which scene change decision module 80 uses to detect a scene change. Feature computer 70 computes the feature for each object in the object list created by object detector 60. Decision module 80 then uses those features to determine whether a scene change has occurred.

When decision module 80 has determined that a frame represents a scene change, it calls upon output generator 90 to create the information needed by the application.

Figure 3:
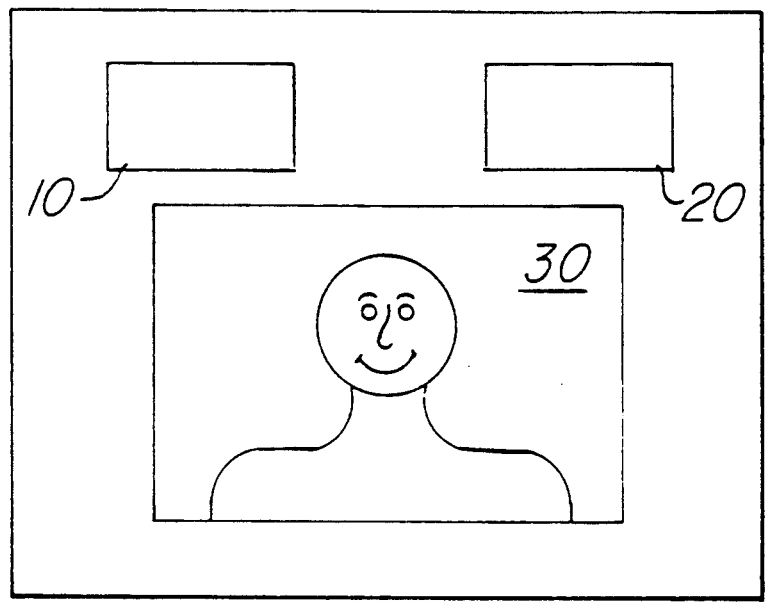
FIG. 3 is an example of the layout of detection zones in an interview scene.

Object detector 60, feature computer 70, and scene change decision module 80, may be implemented at various levels of sophistication depending on cost constraints and assumptions which may be made about the application. For example, in studio interviews, "awards presentations," or similar sequences with relatively constant background and smooth or no motion cameras, the objects used by the scene change detector would be detection zones in the image, as shown in FIG. 3.

Decision module 80 may use spatio-temporal analysis in its determination of whether a scene change has occurred. Spatio-temporal analysis involves calculating a feature property or motion property at various spatial resolutions for successive frames and doing a frame-to-frame comparison for that property to obtain a temporal variation. The property could be as simple as a summation of pixel values for all pixels in a detection zone or it could involve building a Burt Pyramid, (Burt, P. and E. Adelson, "Laplacian Pyramid as a Compact Image Code," IEEE 1983, *Transactions on Communication*, Com. 31, no. 4.). Construction of Burt pyramids and their use in spatio-temporal analysis is considered well known in the art.

In cases where decision module 80 uses a few detection zones, a further simplification of the Burt pyramid reduces the complexity of the spatio-temporal analysis to be cost-efficient. Rather than constructing a complete pyramid, a simple partial convolution or smoothing at the border of the selected zones will minimize the computation by orders of magnitude.

Another example in which spatio-temporal analysis is used by this invention relates to computing motion. A coarse resolution image of the scene is differenced, by taking a pixel-to-pixel difference of the detection zones in two successive images followed by a threshold operation, which yields a motion gradient. A large gradient indicates that an object has moved, and a scene change has been detected. The threshold magnitude would be an adjustable parameter used to control sensitivity to motion.

In a stable scene application, for example interviews with people, where spatial constraints are assumed, the shape of silhouettes of the subject will not be tracked. Rather, the shape will help direct object detector 60 in the assignment of detection zone objects. At least three zones, as shown in FIG. 3, will be used. Zones 10 and 20 are background zones, used to detect change of background, whereas zone 30 is a subject zone, used for changes in subject-related features. Summation and subsequent temporal differences of the average feature value in each zone, when thresholded properly, indicates an object has departed the zone, which would indicate a scene change. As with motion gradient computation, described above, the threshold is an adjustable parameter, in this case to control sensitivity to changes in the feature values. The features are properties such as, but not limited to, light intensity, color, and texture.

Figure 4:
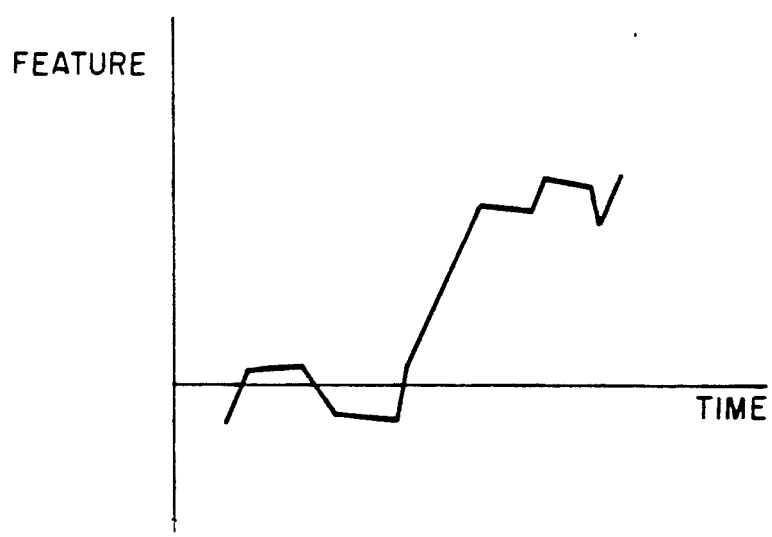
FIG. 4 is an example of a graph of feature-to-time relationships, which would indicate a scene change.

To improve robustness, and minimize the sensitivity to minor motion of the object or the background, two techniques help. As seen in FIG. 4, by not only testing for abrupt changes in intensity induced by motion, but also looking for smooth changes before and after a radical change, a scene change may be detected. The averages should remain relatively constant for many frames before and after dramatic changes in the scene. The number of frames considered is another adjustable parameter which controls the sensitivity of the scene change detector.

When decision module 80 uses one of the simpler techniques, such as summation or average of a feature over all pixels, to analyze for scene changes, the invention includes edge smoothing for each detection zone to minimize errors associated with slight sampling errors of steep gradients at the zone edges. Convolution of the border pixels will blur and therefore desensitize the zone to this source of error.

The computation of spatial or chromatic characteristics of the object zones, like the density of lines and corners, is necessary in certain applications of video scene change detection. In situations where the scene changes to other subjects (e.g., another person) without apparent motion, such as when a video tape has already undergone some form of editing, this spatial and color information of the subject zone will be used to discriminate scene changes. The texture, shape, size, and color of the subject provides decision module 80 with information with which temporal changes will be threshold detected. A Discrete Cosine Transformed (DCT) image will contain the texture information. The system computes color by an algebraic averaging of the primary colors. Computation of size and shape of objects is considered well known in the art.

Applications requiring a wider range of scene change detection, or ones in which several scenes with dynamic motion must be detected, a more complex algorithm must be used. Object detector 60 would not only detect objects but would also compute object segments and label the object and segments, which it does by finding pixel regions in which all pixels have similar values for the desired features. Object detector 60 finds pixel regions by horizontally and vertically scanning adjacent pixels until a pixel has a value which is much greater or smaller than its neighbor, thus indicating the border of a region.

Similarly, feature computer 70 may be more complex. For each object it would compute light intensity, color, texture, and motion. These features would then be fed into scene change decision module 80. Feature computer 70 would be further comprised of spatio-temporal object trackers or devices for computing optical flow data for providing decision logic 80 with motion information.

Decision module 80 could also be more complex by containing an inference engine which processes a set of rules which describes an object's behavior. The system would enable the user to input relevant rules, such as "the camera is not stationary" or "the interview is being conducted at the beach." Those rules could be used to filter relevant from irrelevant changes in a feature, guide the object tracker, and aid in properly segmenting the objects. For example, if it is known that a series of interviews has been filmed at the beach, with the ocean or sky as back-drop, then objects in shades of blue may be ignored in favor of the largest skin-colored object, for any known skin-color.

In feature computer 70, motion estimation at selected zones could occur with direct correlation of a detection zone with the new image. Each pixel in the zone is correlated with the new zone by sliding the old zone over the new zone with an accumulation of the zone differences at each location. The highest value of correlation with respect to the previous center of the zone depicts the velocity vector.

Another method for using texture, shape and size in the scene change detector would be for feature computer 70 to feed spatial-temporal frequency information of either the entire image or for selected zones into decision module 80. Transforms such as the Fast Fourier Transform or Discrete Cosine Transform provide spatial frequency information. Temporal changes in the scene will alter the spatial frequency terms of the transformed image. This technique is very useful because it makes it very easy to compute temporal changes in the features without knowing how many objects or what objects make up a picture. As described for the other techniques above, simple thresholded differences would suffice for indication of a temporal change, which in turn could indicate a scene change.

Some applications require scene change detection in real-time, for others less than real-time is satisfactory, and in some, faster than real-time would be desireable. A person skilled in the art would realize that some of the techniques which the invention uses, cannot be achieved in real-time, and certainly not in faster than real-time, on some computer systems if every video frame is analyzed. On the other hand, high-speed hardware would be able to accomplish all aspects of the invention in real-time. Fast scene change detection may also be accomplished by analyzing a subset of the frames produced by video signal source 10. Video signals are usually produced at 30 frames per second. Because most scenes have a longer duration it is not necessary, for the purpose of scene change detection, to analyze every frame. In this aspect of the invention quantizer 21 would store a reduced sampling of the video frames produced by signal source 10 into frame buffer 25. In applications where real-time is not necessary those aspects of the invention which may not be accomplished in real-time can be achieved by slowing down the video source.

APPLICATIONS

The invention automates the detection of scene changes in a sequence of video frames. There are a number of useful applications of this invention in the video editing art, for example a system to automate some video director tasks, namely enabling the automated creation of video tape logs and a facility for viewing representative images from the scenes that make up a video tape.

A video tape log is a record of the contents on a video tape. It contains information about each scene and the location on the tape where the scene begins. The information describes the scene in terms of location, persons, action and anything else pertinent. In video editing the director relies on the log to select scenes from which to make a final product.

In automating video tape log creation, the scene change detector is connected via application interface 24 to a computer system which incorporates Hypercard-like functionality. Hypercard is a computer program which executes on Apple MacIntosh computers. One way to view Hypercard is as a management system for an electronic stack of note-cards.

Figure 5:
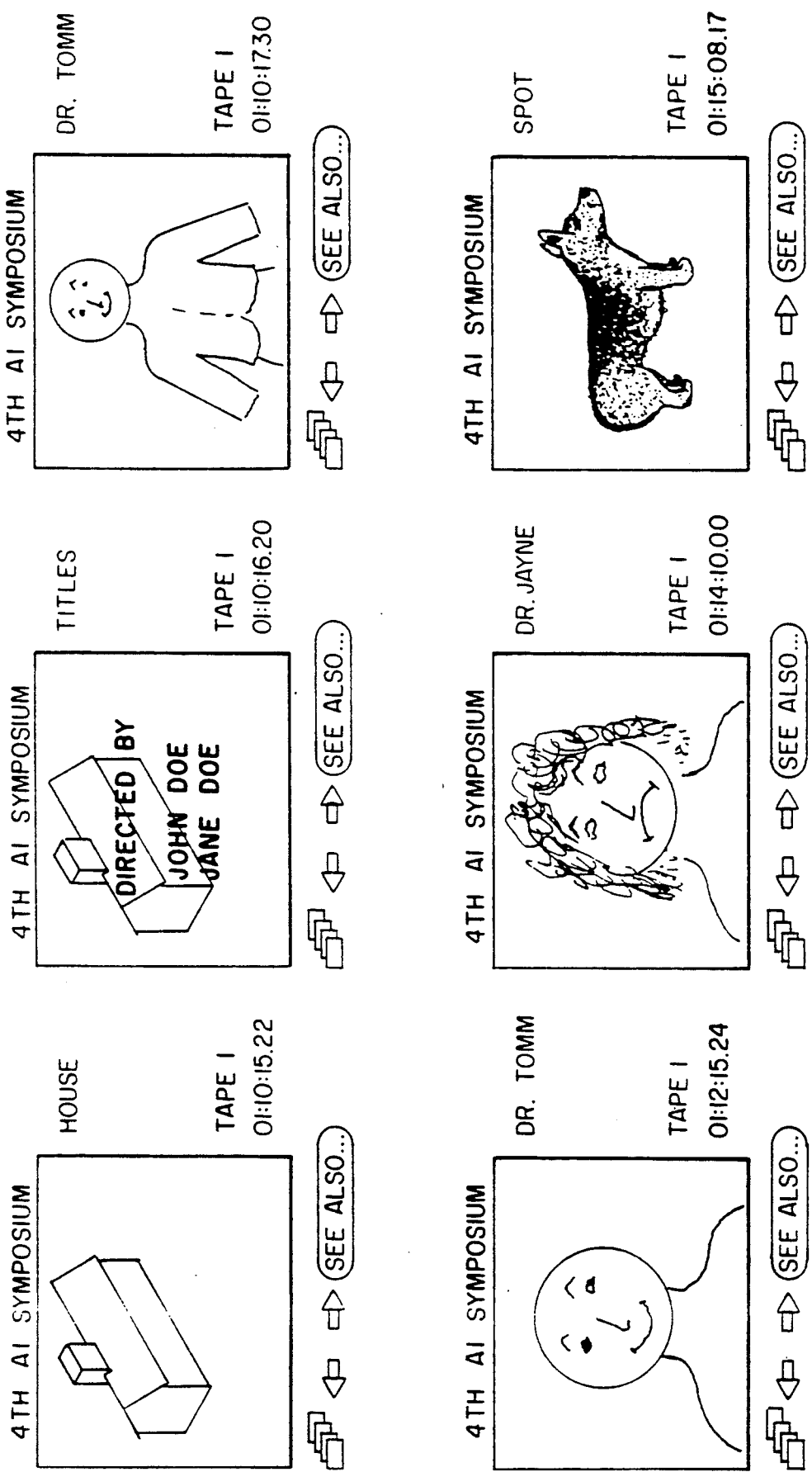
FIG. 5 is a sample hypercard stack from the automatic video directing system, in which each card represents one scene change.

The output from image processor 23 would be a representative image from each scene which has been detected. That image would be sent to application interface 24 and be entered onto a card in the Hypercard stack. The card would also contain the time code number where the scene starts. The operator would be able to enter additional information on the cards. FIG. 5 depicts a sample Hypercard stack of images from scenes on a video tape.

This invention provides at least two advantages in terms of the creation of video tape logs. First, the operator no longer has to scan the video tape to manually detect scene changes. Second, the log, now entered as a hypercard stack, contains a visual record of the contents on a scene. Thus, it both automates part of the task of the operator who produces the video tape logs and it provides the director with a more useful log, because it also contains a pictorial record of what each scene contains.

A second application of the scene change detector is a system for fast-forwarding and rewinding of a video tape. This application of the invention makes it easier for the user of a video tape recorder or video disk system to move from scene to scene.

In the fast-forward navigation system, application interface 24 is connected to control circuitry 27 for the video source. Two new functions, "forward to next scene" and "rewind to previous scene" would be available to the user. When the user selects one of those functions, application interface 24 would send a control signal to video source 10. That signal would tell video source 10 to start a fast-forward/rewind operation while sending video images to scene change detector 20. When scene change detector 20 scene to application interface 24, which in turn would send the command to go to that particular scene to video signal source 10.

A third application of the scene change detector is to video surveillance security systems. Many security systems reduce staffing requirements by having video cameras in many sensitive areas and a guard station with monitors. Most of the time the scene captured by the camera is non-changing, for example the view of an empty lobby. A guard sitting in the guard station scans all the monitors to see if any intruders are entering a restricted area.

In such an application, the scene change detector in conjunction with a computer system, would replace the guard. When the decision processor 23 detects a scene change, then image processor 23 would output a signal to application interface 24 to trigger an alarm.

An advantage of this invention over alarm systems which are triggered by motion detectors is that a scene change detector would allow for some motion in the scene. For example, if a guard dog is present in the restricted area, a motion detector would be useless since the dog would trigger the alarm as it moved around in the area. However, using a scene change detector-based security system, the dog would be an object that the system could track as it moved around in the scene. When an unknown object, for example an intruder, entered the scene, object detector 60 would detect a new object and decision module 80 could use that information to send the appropriate signal to the application output to trigger the alarm.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

What is claimed is:

1. A system for detecting scene changes in a sequence of video image comprising:
   a video signal source; and
   a computer coupled to the video input source for analyzing the video sequence, comprising:
   quantizer coupled to the video signal source for converting the video signal to a digital representation;
   a frame buffer coupled to the quantizer for storing the digital representations of the video signal;
   an image processor for analyzing the digital representations of the video signal to determine where scenes change;
   a digital video random access connection between the frame buffer and the image processor for transmitting the digitized video frames; and
   an application interface coupled to the image processor;
   wherein said image processor comprises:
   (i) a detection zone assignment generator for designating zones which are to be used to detect a scene change;
   (j) a feature change calculator coupled to the detection zone assignment generator for determining frame-to-frame feature changes within each detection zone; and
   (k) a scene change decision module coupled to the feature change calculator for deciding whether the feature changes within the detection zones meets a predetermined decision criteria indicating a scene change.

2. The system in claim 1, wherein said feature change calculator is a light intensity change calculator.

3. The system in claim 1, wherein said decision processor further comprises a comparator to compare the feature change against a threshold value to determine that a scene change has occurred.

4. The system in claim 1, wherein said decision processor uses a number of frames and said predetermined decision criteria when there is large change in light intensity for a zone preceded by a trend of small changes in light intensity in the same zone and followed by a trend of small changes in light intensity in the same zone.

5. The system in claim 1, wherein said application interface is a hypercard-like stack.

6. The system in claim 1, wherein said application interface stores a representative image of each scene, a time code number, and a brief description of the contents and action of the scene onto a hypercard card.

7. The system in claim 1, wherein said application interface is a fast forward device which allows the user to automatically skip to a next scene, a previous scene or any other desired scene.

8. The system in claim 1, wherein said application interface is a security system.

9. The system in claim 24, wherein the computer analyzes a subset of the video images int eh sequence by sampling at an interval.

10. The system in claim 24, wherein the rate at which the video signal source produces images is reduced to the rate at which the computer system is able to analyze the sequence.

11. The system in claim 1, wherein the feature change calculator is a color change calculator.

12. The system in claim 1, wherein the feature change calculator is a texture change calculator.

13. The system in claim 1, wherein the feature change calculator is a motion detector.

14. A method for detecting scene changes in a video sequence, comprising the steps of:
(a) digitizing a video frame;
(b) detecting objects int he digitized video frame;
(c) computing features for the objects detected in step (b);
(d) determining a frame-to-frame difference in said features; and
(e) indicating a scene change when said determined differences meet a certain decision criteria.

15. The method in claim 14, wherein step (b) further comprises the step of:
(f) selecting a plurality of detection zones in the digitized video frame.

16. The method in claim 14, wherein step (b) further comprises the step of:
(i) calculating the light intensity of the object;
(j) determining the color of the object;
(k) finding the texture of the object; and
(l) detecting the motion of the object.

17. The method in claim 14, wherein step (b) further comprises the step of:
(g) segmenting the objects.

18. The method in claim 17, wherein step (c) further comprises the step of:
(h) computing features for each object and for each constituent segment of that object.

19. A system for detecting scene changes in a sequence of video image comprising:
a video signal source; and
a computer coupled to the video input source for analyzing the video sequence, comprising:
quantizer coupled to the video signal source for converting the video signal to a digital representation;
a frame buffer coupled to the quantizer for storing the digital representations of the video signal;
an image processor for analyzing the digital representations of the video signal to determine where scenes change;
a digital video random access connection between the frame buffer and the image processor for transmitting the digitized video frames; and
an application interface coupled to the image processor;
wherein said image processor comprises:
an object detection module for separating an image into discrete objects and for labeling those objects; and
a scene change detection module coupled to the object detection module for detecting a scene change based on a decision criteria.

20. The system in claim 19, wherein said scene change detection module uses large change in appearance of an object, the appearance of a new object of the disappearance of an existing object as the decision criteria.

21. The system in claim 19, wherein said image processor further comprises:
a motion detection module coupled to the scene change detection module for providing said scene change detection module with motion information.

22. The system in claim 19, wherein said application interface is a hypercard-like stack.

23. The system in claim 19, wherein said application interface stores a representative image of each scene, a time code number, and a brief description of the contents and action of the scene onto a hypercard card.

24. The system in claim 19, wherein said application interface is a fast forward device which allows the user to automatically skip to a next scene, a previous scene or any other desired scene.

25. The system in claim 19, wherein said application interface is a security system.

26. The system in claim 19, wherein the computer analyzes a subset of the video images int eh sequence by sampling at an interval.

27. The system in claim 19, wherein the rate at which the video signal source produces images is reduced to the rate at which the computer system is able to analyze the sequence.

28. The system in claim 19, wherein said scene change detection module further comprises:
a feature change calculator coupled to said object detection module and operable to compute a feature change indicative of a scene change in said sequence of video images.

29. The system in claim 28, wherein said feature change calculator is a light intensity change calculator.

30. The system in claim 28, wherein said feature change calculator is a color change calculator.

31. The system in claim 28, wherein said feature change calculator is a texture change calculator.

32. The system in claim 28, wherein said feature change calculator further comprises:
a comparator coupled to said object detection module for comparing said feature change against a threshold value to determine that a scene change has occurred.

33. The system of claim 32, wherein said comparator uses a number of frames and said decision criteria to determine that a scene change has occurred when a large feature change has occurred preceded by a trend of small feature changes and followed by a trend of small feature changes.

* * * * *